United States Patent [19]

Delprato et al.

[11] Patent Number: 5,422,236
[45] Date of Patent: Jun. 6, 1995

[54] SPECTRALLY SENSITIZED SILVER HALIDE PHOTOGRAPHIC ELEMENTS

[75] Inventors: Ivano Delprato, Montenotte; Isabella Cogliolo, Ganova, both of Italy

[73] Assignee: Minnesota Mining and Manufacturing Company, St. Paul, Minn.

[21] Appl. No.: 286,280

[22] Filed: Aug. 5, 1994

[51] Int. Cl.$^6$ ............................................... G03C 1/10
[52] U.S. Cl. ................................... 430/578; 430/577; 430/591; 430/593
[58] Field of Search ................. 430/578, 591, 593, 577

[56] References Cited

U.S. PATENT DOCUMENTS

| | | |
|---|---|---|
| 3,702,767 | 11/1972 | Ohschlager . |
| 3,930,869 | 1/1976 | Tanaka et al. . |
| 4,053,318 | 10/1977 | Sato et al. ........................ 430/591 |
| 4,336,323 | 6/1982 | Winslow . |
| 4,717,650 | 1/1988 | Ikeda et al. . |
| 5,116,722 | 5/1992 | Callant et al. ..................... 430/363 |

FOREIGN PATENT DOCUMENTS

| | | |
|---|---|---|
| WO81/01757 | 6/1981 | European Pat. Off. . |
| 0427892A1 | 11/1989 | European Pat. Off. . |
| 0540295A1 | 10/1992 | European Pat. Off. . |
| WO93/11467 | 6/1993 | European Pat. Off. . |
| 677409A | 6/1989 | Germany . |

*Primary Examiner*—Thorl Chea
*Attorney, Agent, or Firm*—Gary L. Griswold; Walter N. Kirn; Mark A. Litman

[57] ABSTRACT

The present invention refers to a silver halide photographic element containing a support having coated thereon at least a silver halide emulsion layer spectrally sensitized with a sensitizing dye according to the formula (I):

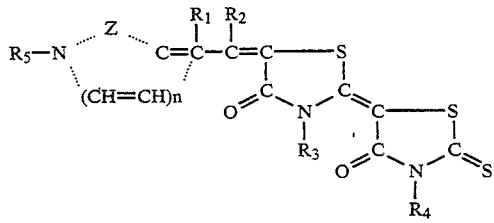

wherein Z represents the atoms necessary to complete a 6-membered nitrogen-containing heterocyclic nucleus; at least 2 members of $R_1$, $R_2$, $R_3$, $R_4$ and $R_5$—but not $R_1$ and $R_2$ together—represent an organic group carrying a water-solubilizing group in free acid form, in salt form or in latent form, and are same or different, the members of $R_1$, $R_2$, $R_3$, $R_4$ and $R_5$ that do not represent a said organic radical carrying a water-solubilizing group represent hydrogen, an alkyl group, an alkenyl group or an aryl group; and n is 0 or 1.

The silver halide photographic material has the advantage to have a broad sensitivity in the red portion of the spectrum. It can be exposed to laser beam sources in the range of 600–700 nm.

7 Claims, No Drawings

SPECTRALLY SENSITIZED SILVER HALIDE PHOTOGRAPHIC ELEMENTS

FIELD OF THE INVENTION

The present invention refers to spectrally sensitized silver halide photographic elements having broad sensitivity in the red portion of the spectrum.

BACKGROUND OF THE ART

Silver halide photography involves the exposure of silver halides with radiation to form a latent image that is developed during photographic processing to form a visible image. Silver halides are intrinsically sensitive only to light in the blue and ultraviolet regions of the spectrum. Thus, when silver halides are to be exposed to other wavelengths of radiation, such as green or red light in a multicolor element, a spectral sensitizing dye is required.

A Helium-neon laser is a typical light source emitting in the red portion of the spectrum (632.8 nm). The advent of solid state diodes that emit red radiation, having wavelengths in the range from 650 to 750 nm, has expanded the useful applications of red-sensitive photographic elements. Because of the wide variety of emission wavelengths, it would be desirable for a red-sensitive photographic element to have broad sensitivity in the red portion of the spectrum. This would allow a single element to be used with light sources, such as lasers and diodes, having a variety of emission wavelengths. Such broad sensitivity can generally be provided by using either a single sensitizing dye that provides broad sensitivity or a combination of sensitizing dyes (usually two) that, by themselves, would provide narrower sensitivity. Many dye combinations have disadvantages, such as poor sensitivity, e.g. due to desensitization, or poor keeping stability, e.g. formation of fog during keeping.

U.S. Pat. No. 5,116,722 discloses a method for forming a silver image by exposing a silver halide emulsion spectrally sensitized to light of 600–690 nm with a trinuclear mero-cyanine dye comprising at least 2 water-solubilizing groups, said trinuclear merocyanine having a benzothiazole or benzoselenazole group. CH patent application No. 677,409 describes merocyanine spectral sensitizing dyes containing at least two acid groups for high contrast silver halide emulsions; a benzothiazole nucleus is preferably present in the structure of the spectral sensitizing dyes.

U.S. Pat. No. 4,717,650 describes a silver halide photographic emulsion having a high spectral-sensitivity in a red-color wavelength range, especially within a wavelength range of from 600 to 690 nm, by use of a benzimidazole pentacarbocyanine spectral sensitizing dye.

U.S. Pat. No. 4,336,323 describes a light insensitive imageable layer comprising a synthetic polymeric binder, a dye containing a quinoline group, a nitrate salt and an acid to obtain a decolourizable imaging system.

Many of the dyes known for spectrally sensitizing photographic silver halide emulsions to the red wavelength of 600 to 690 nm have the disadvantage of having low solubility in water so that they usually have to be dispersed in the emulsions or added thereto in the form of an alcoholic solution. Consequently, they are not removed adequately during the processing. As a result, a considerable residual magenta to blue hue is left in the dried element.

It is an object of the present invention to provide silver halide photographic elements with broad sensitivity in the red portion of the spectrum, having good photographic properties in terms of speed and contrast, and presenting minimal residual stain after processing.

SUMMARY OF THE INVENTION

The present invention refers to a silver halide photographic element containing a support having coated thereon at least a silver halide emulsion layer spectrally sensitized with a sensitizing dye according to the formula (I):

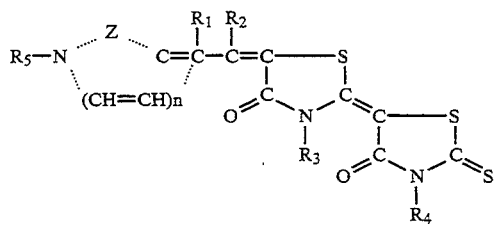

wherein Z represents the atoms necessary to complete a 6-membered nitrogen-containing heterocyclic nucleus optionally containing substituent(s) and/or fused ring(s); at least 2 members of $R_1$, $R_2$, $R_3$, $R_4$ and $R_5$—but not $R_1$ and $R_2$ together—represent an organic group carrying a water-solubilizing group in free acid form, in salt form or in latent form, and are same or different, the members of $R_1$, $R_2$, $R_3$, $R_4$ and $R_5$ that do not represent a said organic group carrying a water-solubilizing group represent hydrogen, an alkyl group, an alkenyl group or an aryl group; and n is 0 or 1.

The above described dye provides broad sensitivity in the red region of the spectrum with good speed, contrast and minimal residual color stain after processing.

DETAILED DESCRIPTION OF THE INVENTION

In the formula (I) of the present invention, Z represents the atoms necessary to complete a 6-membered nitrogen-containing heterocyclic nucleus such as those of the 2-quinoline series (e.g., quinoline, 3-methyl-quinoline, 5-methyl-quinoline, 7-methyl-quinoline, 8-methyl-quinoline, 6-chloro-quinoline, 8-chloro-quinoline, 6-methoxy-quinoline, 6-ethoxy-quinoline, 6-hydroxy-quinoline, 8-hydroxy-quinoline), of the 4-quinoline series (e.g., quinoline, 6-methoxy-quinoline, 7-methoxy-quinoline, 8-methyl-quinoline), and the like, optionally containing substituent(s) and/or fused ring(s). These nuclei may be substituted by any of a number of groups known to be substituents for such nuclei. These include, but are not limited to, sulfo, halogen (e.g. chloro, fluoro), alkyl of 1 to 12 carbon atoms (preferably of about 1 to 4 carbon atoms, e.g. methyl, ethyl, butyl, which may themselves be substituted with known elements such as hydroxy, halogen or sulfo), alkoxy of 1 to 12 carbon atoms (preferably of about 1 to 4 carbon atoms, e.g. methoxy, ethoxy, butoxy), carboxy, carboxylate of from 1 to 4 carbon atom (e.g. methyl ester, ethyl ester), sulfonamido or carbonamido.

When the term "group" or "nucleus" is used in this invention to describe a chemical compound or substituent, the described chemical material includes the basic group or nucleus and that group or nucleus with conventional substitution. Where the term "moiety" is used to describe a chemical compound or substituent, only an unsubstituted chemical material is intended to be included. For example, "alkyl group" includes not only such alkyl moieties such as methyl, ethyl, octyl, stearyl, etc., but also such moieties bearing substituents groups such as halogen, cyano, hydroxyl, nitro, amine, carboxylate, etc. On the other hand, "alkyl moiety" or "alkyl" includes only methyl, ethyl, octyl, stearyl, cyclohexyl, etc.

By "water-solubilizing group" as used in the present invention is meant a group that renders the dye sufficiently soluble in water, that is soluble for at least 0.5 g in 1 liter of water at room temperature and pH >7. In case the water-solubilizing group is in latent form a sufficient solubility is obtained during the alkaline processing.

According to the present invention, at least 2 of the members of $R_1$ to $R_5$ are organic groups, e.g. an alkyl group, such as methyl or ethyl, an aryl group, such as phenyl, carrying a water-solubilizing group, in free acid form, in salt form or in latent form e.g.: —$(CH_2)_m$—COOM, —$C_6H_4$—COOM, —$CH_2$—$C_6H_4$—COOM, —$(CH_2)_m$—$SO_3M$, —$C_6H_4$—$SO_3M$, —$CH_2$—$C_6H_4$—$SO_3M$, —$CH_2$—COO—$CH_2$—COO—$R_5$, —$CH_2$—$CH_2$—CO—$R_6$,
wherein m is an integer preferably of from 1 to 4, M is hydrogen, ammonium, an alkali metal atom, e.g. sodium, potassium and lithium, or an organic amine salt e.g. a triethylemine salt, ethyldiisopropylamine salt, pyridine salt, and $R_6$ is an alkyl group, e.g. methyl.

Examples of water-solubilizing groups in latent form are e.g. —$CH_2$—COO—$CH_2$—COO—$CH_3$ and —$CH_2$—COO—$CH_2$—CO—$CH_3$.

The members of $R_1$ to $R_5$ that do not represent an organic group carrying a water-solubilizing group can be chosen from the group consisting of hydrogen, an alkyl group of 1 to 18 carbon atoms (preferably of 1 to 12 carbon atoms such as methyl, ethyl, propyl, isopropyl, butyl, octyl, etc.), an alkenyl group of 1 to 18 carbon atoms (preferably of 1 to 12 carbon atoms such as allyl) and an aryl group of 6 to 10 carbon atoms (such as phenyl, carboxylphenyl).

Preferably, the present invention refers to a silver halide photographic element containing a support having coated thereon at least a silver halide emulsion layer spectrally sensitized with a sensitizing dye according to the formula (I) wherein Z represents the atoms necessary to complete a substituted or unsubstituted 6-membered nitrogen-containing heterocyclic group optionally containing substituent(s) and/or fused ring(s); at least 2 members of $R_3$, $R_4$ and $R_5$ represent an organic group carrying a water-solubilizing group in free acid form, in salt form or in latent form, and are same or different; $R_1$, $R_2$ and the member of $R_3$, $R_4$ and $R_5$ that does not represent a said organic group carrying a water-solubilizing group can be chosen from the group consisting of hydrogen, an alkyl group, an alkenyl group and an aryl group; and n is 0 or 1.

More preferably, the present invention refers to a silver halide photographic element containing a support having coated thereon at least a silver halide emulsion layer spectrally sensitized with a sensitizing dye according to the formula (II):

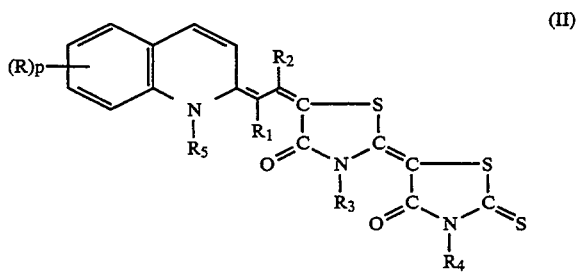

(II)

wherein $R_3$ and $R_4$ each represents an organic group carrying a water-solubilizing group in free acid form, in salt form or in latent form, and are same or different; $R_1$, $R_2$ and $R_5$ represent hydrogen, an alkyl group, an alkenyl group or an aryl group; R represents sulfo, halogen, an alkyl group, an alkoxy group, a sulfonamido or carbonamido, and p represents an integer of 0 to 4, provided that when p is 2 or more, R's may be the same or different.

Examples of the sensitizing dyes according to this invention include the following exemplary compounds. However, the scope of this invention is not limited to only these compounds.

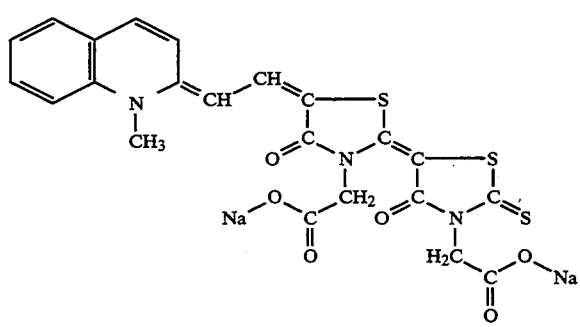

S1

-continued
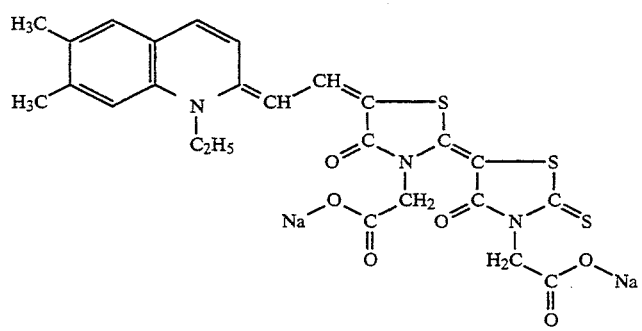
S2
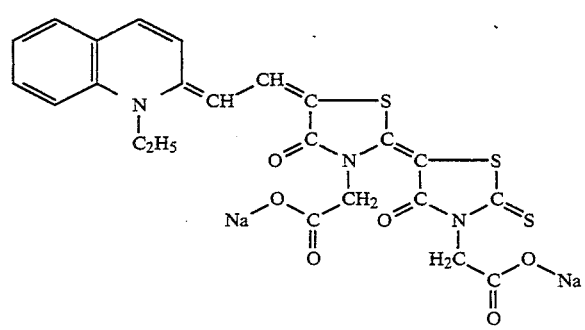
S3
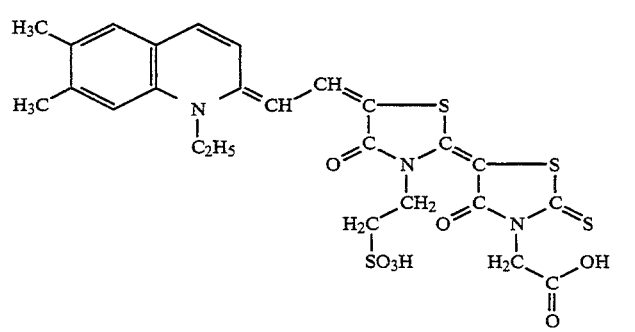
S4
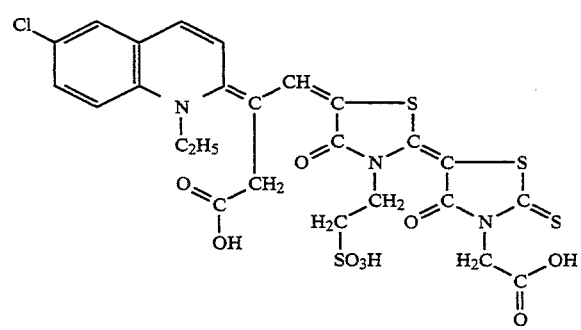
S5

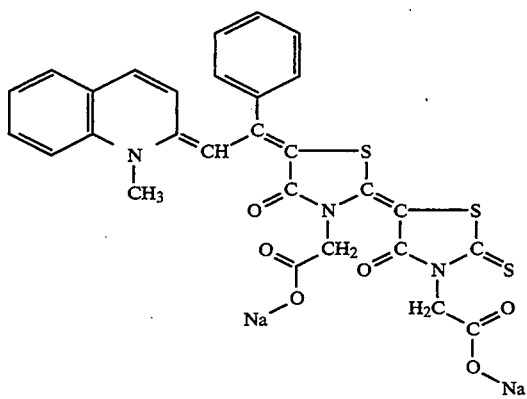

S6

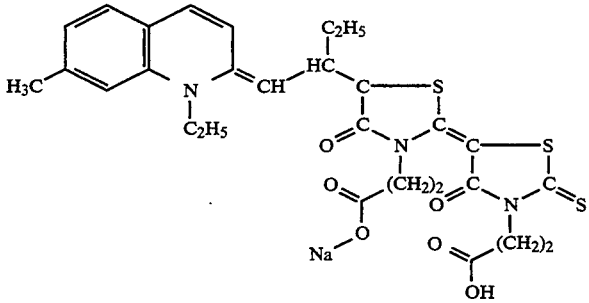

S7

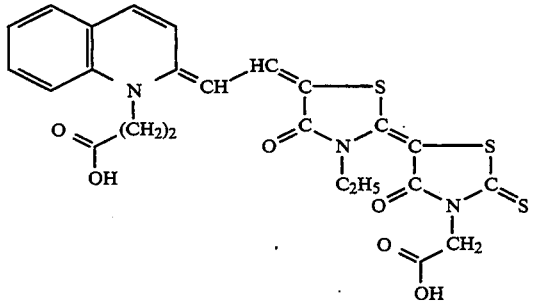

S8

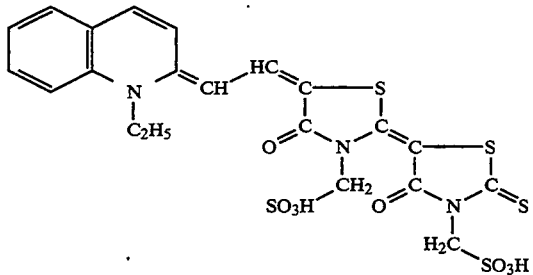

S9

Synthesis of Compound S1

Compound A. 14.3 g of 2-methylquinoline and ethyl-p-toluensulfonate were heated at 120° C. for 2 hours. After cooling, a volume of 100 ml of acetone was added. The precipitate was filtered and dried under reduced pressure at 60° C.

Compound B. 29.4 g of 5-anylino-methyléne-N-ethoxycarbonylmethylrhodanine were dissolved in 100 ml of acetic anydride and the mixture was refluxed for 2 hours and then it was allowed to cool down to room temperature. The precipitate was filtered, washed with ethyl acetate and dried under reduced pressure at 60° C.

Compound C. 6.86 g of compound A and 6.72 g of compound,B were dissolved in 15 ml of DMF A volume of 5.4 ml of triethylamine was added to the mixture, which was stirred at room temperature until separation of a blue compound. The mixture was diluted with ethanol and filtered. The solid, washed with ethanol, was used as such in the following reaction.

Compound D. 7.45 g of compound C and an excess of methyl-p-toluensulfonate were heated at 120° C. for 40 minutes. After cooling, a volume of 100 ml of ethyl acetate was added: a green solid precipitated. It was filtered and dried under reduced pressure at 40° C.

Compound E. 5.6 g of compound D and 1.9 g of 4-oxo-2-thioxo-3-thiazolidine acetic acid were dissolved in 20 ml of methanol and a volume of 4.5 ml of triethylamine was added, and the mixture was refluxed for 50 minutes. After cooling at room temperature, 1.3 g of NaOH 30% were added to the solution and the precipitated solid was filtered, washed with ethanol and dried.

5.6 g of compound E were dissolved in 20 ml of methanol, and 1.3 g of NaOH 30% were added to the solution. The mixture was refluxed for 1 hour and, after cooling, the separated solid was filtered, washed with ethanol and acetone and dried under vacuum at 55° C.

The product structure was confirmed by NMR.

The present invention also refers to a method for forming a silver image comprising image-wise exposing by means of a light source emitting light in the wavelength range of from 600 to 690 nm a photographic material containing a support having coated thereon at least a silver halide emulsion layer spectrally sensitized with a sensitizing dye according to the formula (I):

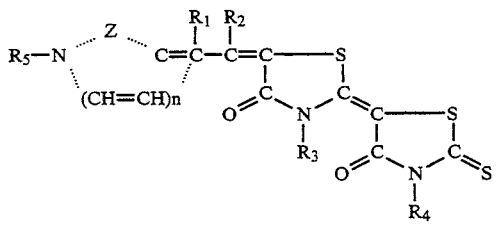

wherein Z represents the atoms necessary to complete a 6-membered nitrogen-containing heterocyclic nucleus optionally containing substituent(s) and/or fused ring(s); at least 2 members of $R_1$, $R_2$, $R_3$, $R_4$ and $R_5$—but $R_1$ and $R_2$ not together—represent an organic group carrying a water-solubilizing group in free acid form, in salt form or in latent form, and are the same or different, the members of $R_1$, $R_2$, $R_3$, $R_4$ and $R_5$ that do not represent a said organic group carrying a water-solubilizing group representing hydrogen, an alkyl group, an alkenyl group or an aryl group; and n is 0 or 1.

The spectral sensitizing dyes of the present invention can be prepared according to well-known procedures in the art, such those described in James, The Theory of Phototgraphic Processes, MacMillan, 4th Edition, 1977.

The spectral sensitizing dye of the present invention spectrally sensitize silver halide emulsions to radiation in the wavelength range of from 600 to 700 nm, especially from 620 to 680 nm, to provide photographic elements which are particularly suitable with a number of commercially available laser diodes. A further important advantage derived from the use of said spectral sensitizing dyes of the o present invention is that the photographic element containing said sensitizing dyes exhibits an increased contrast and a reduced residual color stain after processing.

The spectral sensitizing dyes of the present invention are incorporated in the silver halide photographic emulsion in a content of from 0.01 to 0.20 grams/mol of silver, preferably from 0.02 to 0.16 grams/mol of silver.

The spectral sensitizing dyes of the present invention can be directly dispersed in the emulsion. Alternatively, they may be first dissolved in a suitable solvent such as methyl alcohol, ethyl alcohol, methyl cellosolve, acetone, water, pyridine, or a mixture thereof to add them to the emulsion as a solution. Processes for adding the sensitizing dyes to the photographic emulsion are described, for example, in U.S. Pat. Nos. 3,469,987, 3,676,147, 3,822,135, 4,199,360, and in U.S. Pat. Nos. 2,912,343, 3,342,605, 2,996,287 and 3,429,835. The aforesaid sensitizing dyes may be uniformly dispersed in the silver halide emulsion before coating on a suitable support. Of course, this dispersing procedure may be conducted in any suitable step of preparing the silver halide emulsion.

Any of the various types of photographic silver halide emulsions may be used in the practice of the present invention. Silver chloride, silver bromide, silver iodobromide, silver chlorobromide, silver chloroiodobromide, and mixtures thereof may be used, for example, dispersed in a hydrophilic colloid or carrier. Any configuration of grains, cubic, orthorombic, hexagonal, epitaxial, or tabular (high aspect ratio) grains may be used. The colloid may be partially hardened or fully hardened by any of the variously known photographic hardeners. Such hardeners are free aldehydes, aldehyde releasing compounds, triazines and diazines, aziridines, vinylsulfones, carbodiimides, and the like may be used, as described, for example, in U.S. Pat. Nos. 3,232,764, 2,870,013, 3,819,608, 3,325,287, 3,992,366, 3,271,175 and 3,490,911.

The silver halide emulsions may be chemically sensitized using the usual sensitizing agents. Sulfur containing compounds, gold and noble metal compounds, polyoxylakylene compounds are particularly suitable. Methods for chemically sensitizing silver halide emulsions are described, for example, in Research Disclosure 17643, Section III, 1978.

Other conventional photographic addenda such as coating aids, antistatic agents, acutance dyes, antihalation dyes and layers, antifoggants, latent image stabilizers, supersentizers, antikinking agents, high intensity reciprocity failure reducers, plasticizers, matting agents, developing agents, color couplers, absorbing and scattering materials, which may be added to the silver halide emulsions are o described in Research Disclosure 17643, 1978.

Gelatin is generally used as hydrophilic colloid for the silver halide photographic elements of the present invention. As hydrophilic colloids, gelatin derivatives, natural substances such as albumin, casein, agar-agar, alginic acid and the like, and hydrophilic polymers such as polyvinyl alcohol, polyvinylpyrrolidone, cellulose ethers, partially hydrolized polyvinyl acetate, and the like can be used in addition to or instead of gelatin. Further, gelatin can be partially substituted with polymer latexes obtained by emulsion polymerization of vinyl monomers, such as polyethylacrylate latexes, to improve the physical characteristics of the photographic layers.

Support base used in the silver halide photographic elements of this invention can be any of the conventionally used support bases, such as glass, cloth, metal, film including for example cellulose acetate, cellulose acetatebutyrate, cellulose nitrate, polyester, polyamine, polystyrene, and the like, paper including baryta, coated paper, resin-coated paper, and the like.

The silver halide emulsions according to the present invention may be used as photosensitive emulsions for various photographic elements, such as high surface sensitivity or high internal sensitivity negative emulsions, surface-fogged or unfogged direct-positive emulsions, print-out emulsions, reversal emulsions, emulsions for black-and-white materials, for color materials, radiographic materials, transfer color materials, and the like.

The photographic elements according to this invention may be processed to form a visible image upon association of the silver halides with an alkaline aqueous medium in the presence of a developing agent contained in the medium or in the photographic elements, as known in the art. In the case of color photographic elements, the processing comprises at least a color developing bath and, optionally, a prehardening bath, a neutralizing bath, a first (black and white) developing bath, etc. These and other baths which complete the photographic processing (e.g., bleaching, fixing, bleach-fixing, intensifying, stabilizing and washing baths) are well known in the art and are described for instance in Research Disclosure 17643, 1978.

The present invention is now illustrated by reference to the following example.

EXAMPLE

A cubic monodispersed 0.32 micrometers silver chlorobromide (40 mole percent bromide) was prepared as in Example N. 2 of the European Patent application No. 423,538. The resulting emulsion was gold and sulfur sensitized, then split in several pads and each part was optical sensitized according to the following scheme:

| Emulsion Samples | Optical Sensitizer Type | g/mol Ag |
| --- | --- | --- |
| 1 (comp.) | Reference A | 0.105 |
| 2 (comp.) | Reference B | 0.105 |
| 3 (comp.) | Reference C | 0.105 |
| 4 (inv.) | Compound S3 | 0.105 |

Reference A

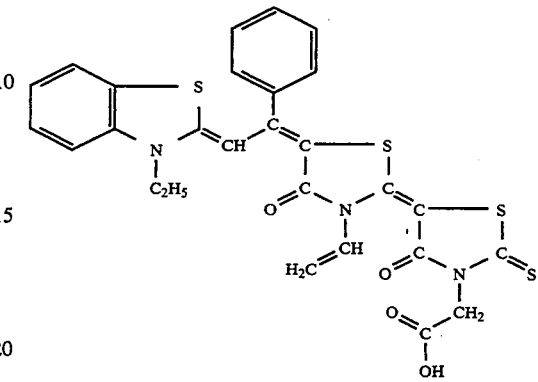

Reference B

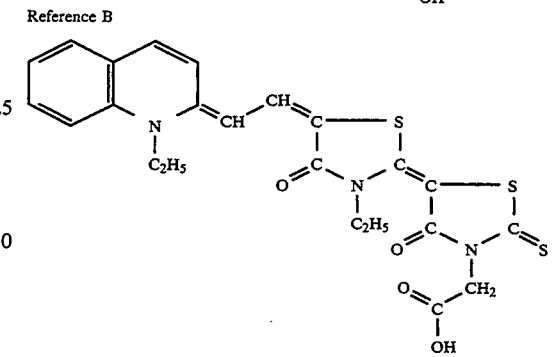

Reference C

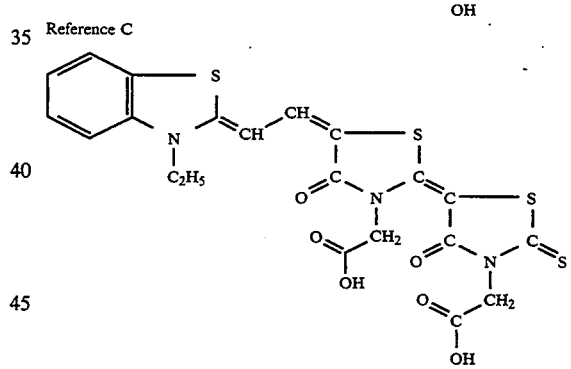

The resulting emulsion samples were coated onto a poly(ethylene 1o terephthalate) support in amount of 4.1 g/sqm as silver. The gelatin content in thus formed emulsion layer was 2.6 g/sqm. A protective layer of gelatin (0.7 g/sqm) was superposed over the emulsion layer. The samples were exposed, in a first case, at 60 Ergs/square centimeter with a laser diode Toshiba Told 9215 emitting a laser beam at 670 nm and, in a second case, to a Helium-neon laser source emitting a 15 laser beam at 632.8 nm. The samples were then sensitometrically examined. The speed has been measured in Log E, wherein E is expressed in lux.seconds at a density of 1.0 above Dmin. The contrast corresponds to the absolute value of the sensitometric curve slope measured at the densities of 0.07 and 0.17 above Dmin. The results are shown in the following Table 1, wherein Speed1 and Contrast1 refer, respectively, to the speed and contrast values obtained when the samples were exposed at 670 nm, and Speed2 and Contrast2 refer, respectively, to the speed and contrast values obtained when the samples were exposed at 632.8 nm.

TABLE 1

| Samples | Speed 1 670 nm | Contrast 1 670 nm | Speed 2 632.8 nm | Contrast 2 632.8 nm | Residual Stain |
|---|---|---|---|---|---|
| 1 (comp.) | 3.18 | 1.25 | 3.09 | 1.34 | deep blue |
| 2 (comp.) | 3.18 | 1.29 | 3.00 | 1.43 | deep blue |
| 3 (comp.) | 2.93 | 0.91 | 3.07 | 1.44 | light red |
| 4 (inv.) | 3.26 | 1.50 | 3.04 | 1.45 | none |

Table 1 shows that comparison sample 1, sensitized by Reference Compound A containing a benzothiazole nucleus having only one water-solubilizing group, presents a deep residual stain. Comparison sample 2, sensitized by Reference Compound B containing a quinoline nucleus having only one water-solubilizing group, again presents a deep residual stain. Comparison sample 3, sensitized by reference Compound C containing a benzothiazole nucleus having two water-solubilizing groups, still has a light residual stain, low speed and unacceptable contrast values when exposed to 670 nm. Sample 4 of the present invention, sensitized with sensitizing dye S3, does not present any residual stain, and still maintains the good sensitometric properties, in terms of contrast and speed, when exposed to both the different wavelengths of 632.8 and 670 nm. This shows that the sensitizing dyes of the present invention containing a quinoline nucleus have better results in comparison to the same sensitizing dyes containing a benzothiazole group, especially for the absence of residual stain.

We claim:

1. Silver halide photographic element containing a support having coated thereon at least a silver halide emulsion layer spectrally sensitized with a sensitizing dye according to the formula (I):

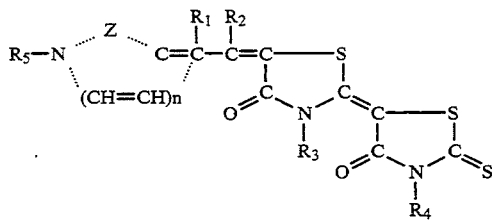

wherein Z represents the atoms necessary to complete a 6-membered nitrogen-containing heterocyclic nucleus; at least 2 members of $R_1$, $R_2$, $R_3$, $R_4$ and $R_5$, but not $R_1$ and $R_2$ together, represent an organic group carrying a water-solubilizing group in free acid form, in salt form or in latent form, and are the same or different, and the members of $R_1$, $R_2$, $R_3$, $R_4$ and $R_5$ which do not represent a said organic group carrying a water-solubilizing group represent hydrogen, an alkyl group, an alkenyl group and an aryl group; and n is 0 or 1.

2. Silver halide photographic element as described in claim 1 wherein at least 2 members of $R_3$, $R_4$ and $R_5$ represent an organic group carrying a water-solubilizing group in free acid form, in salt form or in latent form, and are the same or different, $R_1$, $R_2$ and the member of $R_3$, $R_4$ and $R_5$ which does not represent a said organic group carrying a water-solubilizing group represent hydrogen, an alkyl group, an alkenyl group or an aryl group.

3. Silver halide photographic element as described in claim 1 wherein Z represents a quinoline nucleus.

4. Silver halide photographic element as described in claim 1 wherein the spectrally sensitizing dye corresponds to formula (II):

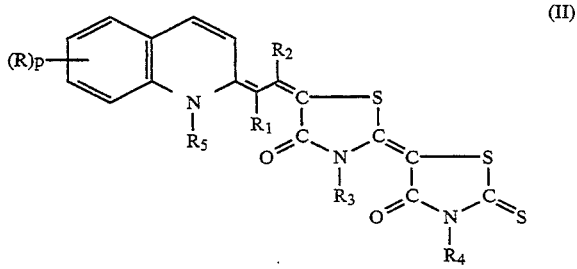

wherein $R_3$ and $R_4$ each represents an organic group carrying a water-solubilizing group in free acid form, in salt form or in latent form, and are the same or different; $R_1$, $R_2$ and $R_5$ represent hydrogen, an alkyl group, an alkenyl group or an aryl group; R represents sulfo, halogen, an alkyl group, an alkoxy group, sulfonamido or carbonamido, and p represents an integer of 0 to 4, provided that when p is 2 or more, R's may be the same or different.

5. Silver halide photographic element as described in claim 1 wherein $R_3$ and $R_4$ each represents $CH_2$—COOH.

6. Method for forming a silver image comprising image-wise exposing by means of a light source emitting light in the wavelength range of from 600 to 690 nm a photographic material containing a support having coated thereon at least a silver halide emulsion layer spectrally sensitized with a sensitizing dye according to the formula (I):

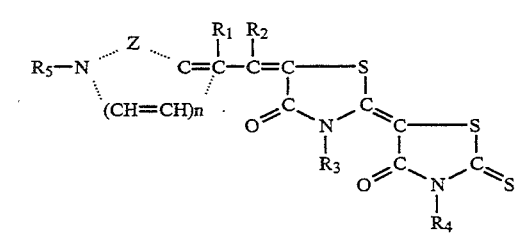

wherein Z represents the atoms necessary to complete a 6-membered nitrogen-containing heterocyclic nucleus; at least 2 members of $R_1$, $R_2$, $R_3$ and $R_4$, but not $R_3$ and $R_4$ together, represent an organic group carrying a water-solubilizing group in free acid form, in salt form or in latent form, and are same or different, the members of $R_1$, $R_2$, $R_3$ and $R_4$ that do not represent a said organic carrying a water-solubilizing group represent hydrogen, an alkyl group, an alkenyl group or an aryl group; and n is 0 or 1.

7. Method for forming a silver image as described in claim 6 wherein Z represents a quinoline nucleus.

* * * * *

UNITED STATES PATENT AND TRADEMARK OFFICE
CERTIFICATE OF CORRECTION

PATENT NO. : 5,422,236
DATED : June 6, 1995
INVENTOR(S) : Delprato et al.

It is certified that error appears in the above-indentified patent and that said Letters Patent is hereby corrected as shown below:

Column 3, lines 24-25, delete "$-CH_2-CH_2-CO-R_6,$"
and insert ---$CH_2-COO-CH_2-CO-R_6,$--.

Column 9, line 53, delete "the o present"
and insert --the present--.

Column 10, line 39, delete "are o described"
and insert --are described--.

Column 11, line 53, delete "pads" and insert --parts--.

Signed and Sealed this

Fourteenth Day of November, 1995

Attest:

BRUCE LEHMAN

Attesting Officer     Commissioner of Patents and Trademarks